US008464682B2

(12) United States Patent
Takeda et al.

(10) Patent No.: US 8,464,682 B2
(45) Date of Patent: Jun. 18, 2013

(54) AIR INTAKE DEVICE FOR INTERNAL COMBUSTION ENGINE

(75) Inventors: Tetsuma Takeda, Kariya (JP); Ryo Sano, Kariya (JP)

(73) Assignee: Denso Corporation, Kariya (JP)

( * ) Notice: Subject to any disclaimer, the term of this patent is extended or adjusted under 35 U.S.C. 154(b) by 283 days.

(21) Appl. No.: 12/941,129

(22) Filed: Nov. 8, 2010

(65) Prior Publication Data

US 2011/0107995 A1 May 12, 2011

(30) Foreign Application Priority Data

Nov. 12, 2009 (JP) ................................ 2009-258672

(51) Int. Cl.
*F02M 35/10* (2006.01)

(52) U.S. Cl.
USPC .................... 123/184.56; 123/305; 123/190.2

(58) Field of Classification Search
USPC .................... 123/305, 306, 336, 337, 184.55, 123/184.56, 190.1, 190.2; 251/304, 305
See application file for complete search history.

(56) References Cited

U.S. PATENT DOCUMENTS 1,440,592 A * 1/1923 Gile ......................... 123/184.56
3,061,180 A * 10/1962 Durgin ............................ 418/36
4,700,669 A * 10/1987 Sakurai et al. ........... 123/188.14
8,095,289 B2 1/2012 Suzuki et al.
8,118,007 B2 2/2012 Sano
2007/0063164 A1* 3/2007 Torii et al. ..................... 251/308
2007/0138693 A1* 6/2007 Torii et al. ...................... 264/242
2007/0181097 A1* 8/2007 Torii et al. ...................... 123/306
2008/0035094 A1* 2/2008 Torii et al. ................ 123/188.14
2008/0103667 A1 5/2008 Suzuki et al.
2009/0050094 A1* 2/2009 Sano ........................ 123/184.21
2009/0050098 A1* 2/2009 Sano et al. ............... 123/184.61
2009/0255121 A1* 10/2009 Ichikawa et al. ......... 29/890.127
2010/0122680 A1* 5/2010 Sano ........................ 123/184.56
2010/0251987 A1 10/2010 Sano

FOREIGN PATENT DOCUMENTS

JP 4-78874 12/1992
JP P2004-301064 A 10/2004
JP P2008-106708 A 5/2008
JP P2008-274785 A 11/2008
JP P2010-242618 A 10/2010

OTHER PUBLICATIONS

U.S. Appl. No. 12/754,806, Ryo Sano, filed Apr. 6, 2010.

* cited by examiner

*Primary Examiner* — John Kwon
*Assistant Examiner* — Johnny Hoang
(74) *Attorney, Agent, or Firm* — Nixon & Vanderhye P.C.

(57) ABSTRACT

An air intake device for an engine includes a duct having therein a first air flow passage, a housing having therein a second air flow passage, a rotary valve having a valve plate. A block of the housing, which conducts intake air to an intake port of a cylinder head, has a circular opposed surface that follows a shape of a curved surface portion of the valve plate. Moreover, the block of the housing has a protrusion that protrudes toward an upstream side of the second air flow passage in an air flow direction so as to contact a duct protrusion of the duct. Therefore, a localized flow of the intake air, which has flowed into the second air flow passage from an opening of the first air flow passage, can be restrained from spreading, and a flow rate of the localized flow can be restrained from slowing down.

18 Claims, 13 Drawing Sheets

AIR INTAKE DEVICE FOR INTERNAL COMBUSTION ENGINE

CROSS REFERENCE TO RELATED APPLICATION

The present application is based on Japanese Patent Application No. 2009-258672 filed on Nov. 12, 2009, the disclosure of which is incorporated herein by reference.

FIELD OF THE INVENTION

The present invention relates to an air intake device for an internal combustion engine, which is configured to generate an intake-air vortex flow in a combustion chamber of the internal combustion engine. In particular, the present invention relates to an air intake device for an internal combustion engine, which is configured to generate a straight flow (localized flow) in an intake port of the internal combustion engine.

BACKGROUND OF THE INVENTION

A fluid flow amount control valve, in which a circular curved surface of a housing is arranged at the outer periphery of a rotary valve, has been proposed. For example, refer to JP4-078874 B.

For example, the fluid flow amount control valve described in JP4-078874 B is used as a tumble flow control valve (TCV), which is configured to localize intake air flow at one side in an intake passage communicated with a combustion chamber of an internal combustion engine to generate a vertical-direction intake-air vortex flow in the combustion chamber of the internal combustion engine. In this case, if a clearance formed between an inner peripheral surface of the circular curved surface of the housing and an outer peripheral surface of a circular valve element of the rotary valve is large, the amount of leakage air may become large in a fully-closed state of the rotary valve. The intake air is leaked from the entire periphery of the circular valve element of the rotary valve. Thus, by localizing the intake air required to the TCV at one side in the intake passage, a function to generate a straight flow (localized flow) that is localized at an upper side of an intake port of the internal combustion engine in a height direction thereof may be decreased.

In order to generate a strong tumble flow in a cylinder (combustion chamber) of the internal combustion engine by generating the straight flow (localized flow) that is localized at the upper side of the intake port of the internal combustion engine, Japanese Patent Application No. 2009-092280 (filed on Apr. 6, 2009), which corresponds to U.S. patent application Ser. No. 12/754,806, has been already applied.

As shown in FIGS. 17A to 18B, a valve unit (air flow control valve) of the above-described application includes a housing 101 configured to be connected to the intake port of the internal combustion engine, a duct 102 that is inserted in and supported by the housing 101, a cover 103 that fixes an upper-side end portion of the duct 102 to an upper-side end surface of the housing 101 and covers the upper-side end portion of the duct 102, a valve shaft 104 that is rotatably supported by the housing 101, and a substantially U-shaped rotary valve (swing-type rotary valve) that reciprocates around the valve shaft 104 in a rotational direction.

The rotary valve includes a pair of connecting portions 105 that is connected to the valve shaft 104, a pair of side plates 106 that extends outward in a radial direction of the valve shaft 104 from both connecting portions 105, a valve plate 107 configured to change opening areas of air flow passages 111, 112 by being reciprocated around the valve shaft 104 in the rotational direction so as to move along a downstream end surface (circular curved line portion) of the duct 2 and the like.

Each of the side plates 106 is arranged to be opposed to an outer surface of the duct 102 with a clearance interposed therebetween.

In a fully-closed state of the rotary valve, the valve plate 107 is arranged to be opposed to the downstream end surface of the duct 102 and an air outlet of the air flow passage 111 with a clearance interposed therebetween. Furthermore, the air flow passage 111 has an opening 114 configured to generate the straight flow (localized flow) that is localized at the upper side of the intake port of the internal combustion engine in the height direction. In the fully-closed state of the rotary valve, the opening 114 is located between a canopy-shaped duct protrusion 113, which is formed on the downstream end surface of an upper wall of the duct 102, and the valve plate 107.

However, in the valve unit shown in FIGS. 17A to 18B, the rotary valve surrounds the duct 102 inserted in the housing 101, and a clearance is formed around the rotary valve.

The clearance around the rotary valve, for example, a clearance formed between the outer surface of the duct 102 and an opposed surface of each of the side plates 106 of the rotary valve is opened to an inner space of the housing 101. Thus, leaked air which has leaked into a top clearance 121 or a side clearance 122 from the clearance around the rotary valve passes through the top clearance 121 or the side clearance 122 to flow into the air flow passage 112.

The above-described application has an object to generate the straight flow (localized flow) that is localized at the upper side of the intake port of the internal combustion engine and the air flow passage 112 in the height direction. However, the clearance is formed around the rotary valve so that an air flow passage for the leaked air is enlarged. Thus, the straight flow (localized flow), which has flowed into the air flow passage 112 from the opening 114 in the fully-closed state of the rotary valve, may be affected by the leaked air which flows into the air flow passage 112 from the top clearance 121 or the side clearance 122, and thereby the straight flow (localized flow) may spread or a flow rate of the localized flow may slow down.

Therefore, in the valve unit shown in FIGS. 17A to 18B, an effect by generation of the localized flow, which is an intended object, cannot be obtained efficiently.

SUMMARY OF THE INVENTION

It is an object of the present invention to provide an air intake device for an internal combustion engine, which can generate efficiently a straight flow (localized flow) in an intake port of the internal combustion engine. Furthermore, it is another object of the present invention to provide an air intake device for an internal combustion engine, which can restrain the straight flow (localized flow) in the intake port of the internal combustion engine from spreading and can restrain a flow rate of the localized flow from slowing down.

According to one aspect of the present invention, an air intake device for an internal combustion engine, includes a duct having therein a first air flow passage configured to conduct air into a combustion chamber of the internal combustion engine, a housing arranged to surround a periphery of the duct and having therein a second air flow passage that is communicated with an intake port of the internal combustion engine, a shaft rotatably supported by the housing, and a substantially U-shaped rotary valve configured to reciprocate around the shaft in a rotational direction. The rotary valve has a valve plate. The first air flow passage has an opening located between a downstream end of the duct and the valve plate and configured to generate a localized flow in the intake port of the internal combustion engine when the rotary valve is in a fully-closed state. The valve plate is configured to reciprocate around the shaft in the rotational direction so as to move outside the duct and along the downstream end of the duct, so that opening areas of the first and second air flow passages are changed. The valve plate has a circular curved surface portion having a radius of curvature centered on the shaft. The housing has a pair of opposed walls arranged at a downstream side of a moving path of the rotary valve in an air flow direction. The opposed walls are opposed to each other with the second air flow passage interposed between the opposed walls. Each of the opposed walls has a circular opposed surface that follows a shape of the curved surface portion.

Accordingly, in the fully-closed state of the rotary valve, generation of an air flow other than a main flow of air, which has flowed into the second air flow passage formed between the opposed walls of the housing from the opening, can be suppressed.

Thus, spreading of straight flow (localized flow) of the air, which has flowed into the second air flow passage formed in the housing from the first air flow passage formed in the duct through the opening, and slowing down of a flow rate of the localized flow can be suppressed. That is, spreading of the straight flow (localized flow) in the intake port of the internal combustion engine can be suppressed, and the flow rate of the localized flow can be restrained from slowing down. Therefore, the straight flow (localized flow) can be generated in the intake port of the internal combustion engine efficiently. That is, an effect by generation of the localized flow can be obtained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Hereinafter, embodiments of the present invention will be described with reference to drawings.

(First Embodiment)

Figure 3A:
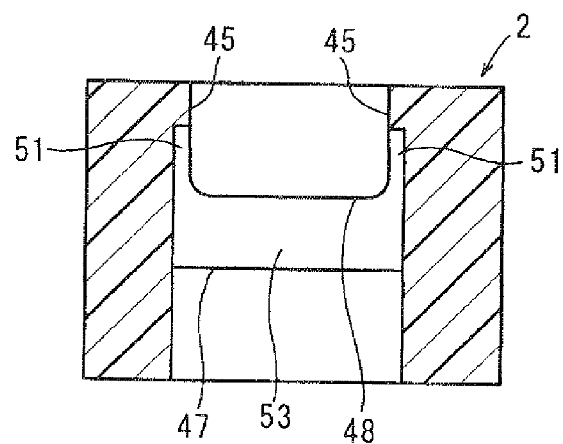
FIG. 3A is a cross-sectional view showing a housing according to the first embodiment of the present invention, taken along the line IIIA-IIIA of FIG. 3B.
Figure 3B:
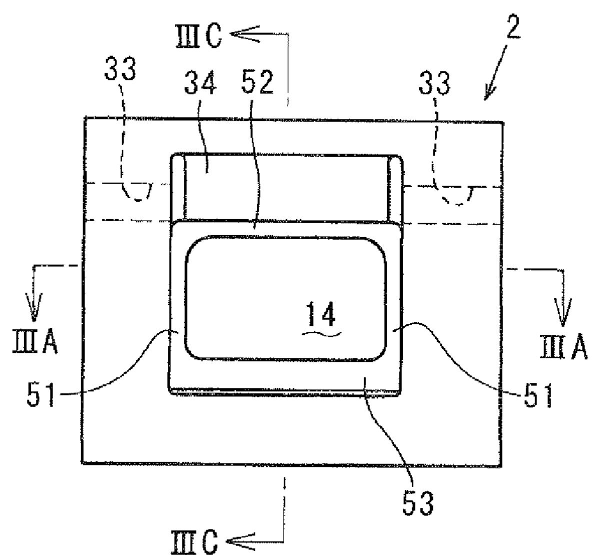
FIG. 3B is a front view showing the housing according to the first embodiment of the present invention.
Figure 3C:
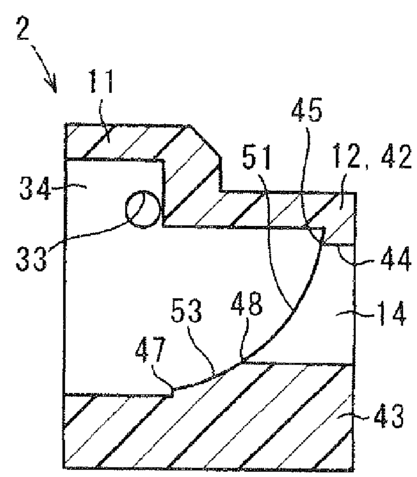
FIG. 3C is a cross-sectional view showing the housing according to the first embodiment of the present invention, taken along the line IIIC-IIIC of FIG. 3B.

The first embodiment of the present invention is described with reference to FIGS. 1A to 3C. FIGS. 1A to 2B show a valve unit (TCV), and FIGS. 3A to 3C show a housing.

An air intake device for an internal combustion engine having multiple cylinders of the present embodiment includes multiple valve units, each of which is used as an intake air flow control valve (tumble flow control valve, i.e., TCV) housed in an intake pipe (intake duct) of the internal combustion engine (engine).

The valve unit includes a duct 1 made of synthetic resin, into which intake air which has flowed out of a throttle body or a surge tank flows, a housing 2 made of synthetic resin, which is arranged to surround the periphery of the duct 1, a rotating shaft (shaft 3 made of metal) which is rotatably supported by the housing 2, and two connecting portions 5 which are connected (support fixation) to a resin molding portion (shaft 4 made of synthetic resin), which covers the periphery of the shaft 3, by insert molding. The valve unit includes a rotary valve made of metal, which reciprocates (rotates) around the shafts 3, 4 in a rotational direction.

The rotary valve is rotatably (swingably) housed in an inner space of the housing 2. The rotary valve is a substantially U-shaped air flow control valve (swing-type rotary valve), which generates a vertical-direction swirling flow (intake-air vortex flow, tumble flow) in a combustion chamber of each of the cylinders of the engine. The rotary valve includes a valve plate 6, which changes an opening area of an air flow passage that is communicated with the combustion chamber of each of the cylinders of the engine, and a pair of side plates 7 which extends to the shafts 3, 4 from both end portions of the valve plate 6.

The housing 2 has a block (partition wall) 11, which is arranged to surround the periphery of the duct 1 in a circumferential direction, a block (nozzle) 12, which extends toward a downstream side (a side of an intake port) in an air flow direction than a downstream end of the block 11, and the like.

The air intake device for an internal combustion engine is a multiple-integrated device for opening and closing an intake passage (device for opening and closing a valve) that includes multiple valve units arranged parallel to each other at regular intervals in an axial direction (rotational axis direction) of the shaft 3. In each of the valve units, the duct 1 and the rotary valve (including the valve plate 6 and the pair of side plates 7) are housed in the housing 2.

The engine includes multiple cylinders (first to fourth cylinders). The engine includes a cylinder block in which the first to fourth cylinders are straight arranged in an arrangement direction of the cylinders, and a cylinder head having multiple intake ports and multiple exhaust ports.

Each of the intake ports independently connected to the combustion chamber of each of the cylinders of the engine is opened and closed by a poppet intake valve. Each of the exhaust ports independently connected to the combustion chamber of each of the cylinders of the engine is opened and closed by a poppet exhaust valve.

The cylinder head of the engine has a connecting surface (fastening surface), to which the housing 2 is fastened and fixed by a fastening bolt. The cylinder head has multiple spark plugs such that an end portion of each spark plug is exposed to the combustion chamber of each of the cylinders. The cylinder head has multiple injectors (electromagnetic fuel injection valves), each of which injects fuel into the intake port at most appropriate timing.

Furthermore, the cylinder head of the engine is connected to intake pipes (intake ducts) and exhaust pipes (exhaust ducts). Each of the intake pipes is configured to conduct intake air into the combustion chamber of each of the cylinders, and each of the exhaust pipes is configured to discharge exhaust gas, which has flowed out of the combustion chamber of each of the cylinders of the engine, to an outside through an exhaust gas purification device.

The intake duct forms therein an intake passage that conducts clean air, which has filtered by an air cleaner, into the combustion chamber of each of the cylinders of the engine through the throttle body of an electronic throttle device, the surge tank, an intake manifold, the duct 1, and the housing 2. The intake duct has an air cleaner case, an air cleaner hose (or the intake pipe), the throttle body, the surge tank, the intake manifold (the duct 1 and the housing 2) and the like.

The cylinder block of the engine has therein four combustion chambers in the arrangement direction of the cylinders. Furthermore, in a cylinder bore formed in each of the cylinders of the cylinder block, a piston connected to a crankshaft is slidably supported in a sliding direction through a connecting rod.

The valve unit is arranged in an engine compartment of a vehicle such as a motor vehicle. The valve unit narrows cross-sectional areas of air flow passages 13, 14, which are communicated with the combustion chamber of each of the cylinders of the engine, and configures an intake-air vortex-flow generating device (air flow control valve, tumble flow control valve, i.e., TCV) which generates a vertical-direction swirling flow (intake-air vortex flow, tumble flow) in the combustion chamber of each of the cylinders of the engine. The valve unit is incorporated into an engine intake system with the electronic throttle device having a throttle valve arranged in the throttle body.

The air flow passage 13 (i.e., first air flow passage) is formed in an internal space of the duct 1. The intake manifold has multiple branched intake pipes, and a branched intake passage is formed in each of the branched intake pipes. The air flow passage 13 configures an intake passage (relay passage) that conducts intake air, which has flowed from the branched intake passage, into the air flow passage 14.

The air flow passage 14 (i.e., second air flow passage) is formed in an internal space of the housing 2. The air flow passage 14 configures an intake passage (outlet passage) that conducts the intake air, which has flowed out of the air flow passage 13, to the intake port of each of the cylinders of the engine.

The air flow passages 13, 14 are connected to the combustion chamber of each of the cylinders of the engine through each of the intake ports of the cylinder head.

The duct 1 is integrally formed and is made of synthetic resin. The duct 1 is configured by a component different from the housing 2. The duct 1 is arranged to surround the periphery of the air flow passage 13 in a circumferential direction. The duct 1 is a peripheral wall portion having a rectangular tube shape, which extends in an air flow direction. The duct 1 is inserted in and supported by the housing 2.

The duct 1 is arranged in an inner side of the rotary valve (space surrounded by the valve plate 6 and the side plates 7). The duct 1 has a pair of side walls (right wall, left wall) at both sides thereof in a horizontal direction, which is perpendicular to the air flow direction of the air flow passage 13. The duct 1 has a pair of vertical walls (upper wall, lower wall) at both sides thereof in a vertical direction of the vehicle, which is perpendicular to the air flow direction of the air flow passage 13.

The duct 1 opens at both sides thereof in the air flow direction of the air flow passage 13 (upstream end, downstream end). The duct 1 extends straight from an upstream side (air inlet) of the air flow passage 13 in the air flow direction toward a downstream side (air outlet) of the air flow passage 13 in the air flow direction so as to pass through the inner side of the rotary valve (space surrounded by the valve plate 6 and the side plates 7).

The duct 1 has a duct protrusion 15 on the upper wall of the duct 1 at the downstream end of the duct 1 in the air flow direction. The duct protrusion 15 having a canopy shape (U shape) is formed to protrude toward a downstream side in the air flow direction from a downstream end surface of the duct 1. An upper opening 16 is formed between an inner surface of the duct protrusion 15 and the rotary valve (valve plate 6). The duct protrusion 15 on the upper wall of the duct 1 may be configured to have a function as a fully-closed stopper that restrains the rotary valve to be located at a fully-closed position.

The duct 1 has a circular curved line portion 17, which has a radius of curvature centered on the shafts 3, 4, at the downstream end thereof (periphery of opening) in the air flow direction, in particular, the downstream end surfaces of the side walls of the duct 1. The curved line portion 17 is a circular curved portion that follows a shape of an inner wall surface of a curved surface portion 18 of the valve plate 6 of the rotary valve in a curvature direction, and that curves smoothly from a lower end portion of the downstream end surfaces of the side walls of the duct 1 (end portion at a side of the lower wall of the duct 1). When a rotary valve is in a fully-closed state (hereinafter also referred to as in a fully-closed state of the rotary valve), the curved line portion 17 is arranged to be opposed to the curved surface portion 18 of the valve plate 6 of the rotary valve. A first clearance is formed between an outer wall surface of the curved line portion 17 in the curvature direction (convex curved surface) and the inner wall surface of the curved surface portion 18 in the curvature direction (concave curved surface).

Furthermore, a connecting flange portion (not shown), which is fastened and fixed to the connecting surface of the housing 2 by a screw or the like, is formed at the upstream end of the duct 1 in the air flow direction.

The housing 2 is a component that configures a part of the intake manifold (downstream portion), and is sandwiched and connected between an upstream portion of the intake manifold and the connecting surface of the cylinder head. The housing 2 is used for the multiple valve units in common. The housing 2 has an actuator that drives opening and closing of multiple rotary valves (each of which having the valve plate 6 and the pair of side plates 7) through the shaft 3. The actuator includes a motor, which generates driving force (driving torque) when electric power is supplied thereto, power-transmitting mechanism (e.g., gear reduction mechanism), which transmits the driving torque of the motor to the shaft 3, and the like.

The housing 2 is integrally formed and is made of synthetic resin, and has multiple internal spaces (multiple storing chambers, the number of which corresponds to the number of the cylinders). The housing 2 is configured by the blocks 11, 12 each having a rectangular tube shape, which are integrally formed and made of synthetic resin.

The block 11 of the housing 2 is arranged at an upstream side in the air flow direction than an upstream end of the block 12, which is formed to be thicker than the block 11.

In the fully-closed state of the rotary valve, a top clearance 21 is formed between an outer surface (upper end surface) of the upper wall of the duct 1 and an inner surface of an upper wall of the block 11 of the housing 2. Furthermore, in the fully-closed state of the rotary valve, a side clearance 22 is formed between an outer surface of each of the side walls (both surfaces) of the duct 1 or an outer surface of each of the side plates 7 and an inner surface of each of side walls of the block 11 of the housing 2.

A rectangular tube-shaped space is formed between the block 11 and the outer surface of the duct 1.

The rotary valve (the side plates 7) is housed in both side spaces, which are formed at both sides in an axial direction parallel to the shaft 3, of the rectangular tube-shaped space, so as to be capable of reciprocating in the rotational direction. The side spaces are located outside both side surfaces of the duct 1 in an axial direction of the duct 1.

Furthermore, a valve-housing concave portion 31, in which the rotary valve (the side plates 7, the valve plate 6) is housed when the rotary valve is in a fully-opened state (hereinafter also referred to as in a fully-opened state of the rotary valve), is formed at a bottom-side space that is located at a lower side than the duct 1 in the vertical direction of the vehicle (in a vertical direction in drawings, gravitational direction) in the rectangular tube-shaped space. The valve-housing concave portion 31 opens to be communicated with the air flow passage 14 near the air outlet of the air flow passage 13 formed in the duct 1 (near the downstream end of the duct 1).

The housing 2 has a connecting surface (fastening surface), which is air-tightly connected (fastened and fixed) to the connecting surface of the connecting flange portion of the duct 1, at the upstream end of the housing 2 in the air flow direction, i.e., the upstream end of the block 11. The block 11 has a partition portion 32 that divides adjacent two internal spaces among the multiple internal spaces. The partition portion 32 has a shaft through-hole 33 in which the shafts 3, 4 of the rotary valve are inserted.

The block 12 of the housing 2 is formed integrally with the block 11. The housing 2 has a connecting surface (fastening surface), which is air-tightly connected (fastened and fixed) to the connecting surface of the cylinder head, at the downstream end of the housing 2 in the air flow direction, i.e., the downstream end of the block 12. The block 12 has multiple (corresponding to the number of the cylinders) square ring-shaped recesses (not shown) for housing square ring-shaped gaskets (not shown) that tightly seal a gap formed between the connecting surface of the cylinder head and the connecting surface of the housing 2 at an end surface of an open end edge of the block 12 (connecting surface that circularly surrounds the periphery of the air outlet of the air flow passage 14).

The block 12 of the housing 2 will hereinafter be described in detail.

The shafts 3, 4 of the present embodiment are arranged outside the outer surface of the upper wall of the duct 1. That is, the shafts 3, 4 are arranged so as to pass through a shaft-housing concave portion 34 that extends in the axial direction parallel to the shaft 3.

Figure 1A:
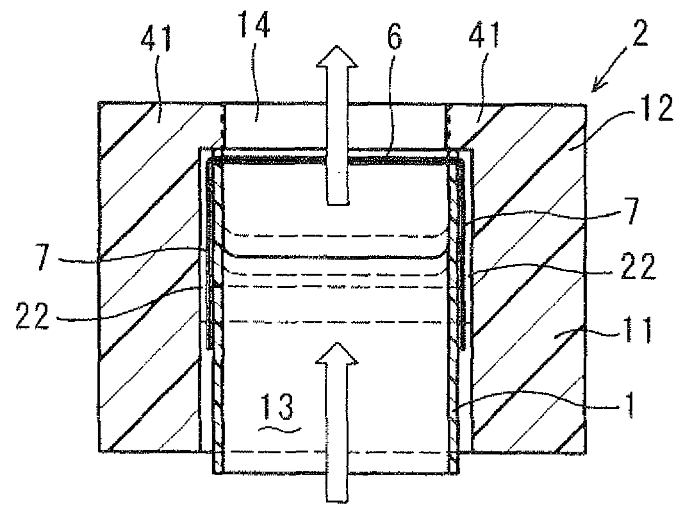
FIG. 1A is a cross-sectional view showing a valve unit according to a first embodiment of the present invention, taken along the line IA-IA of FIG. 1B.
Figure 1B:
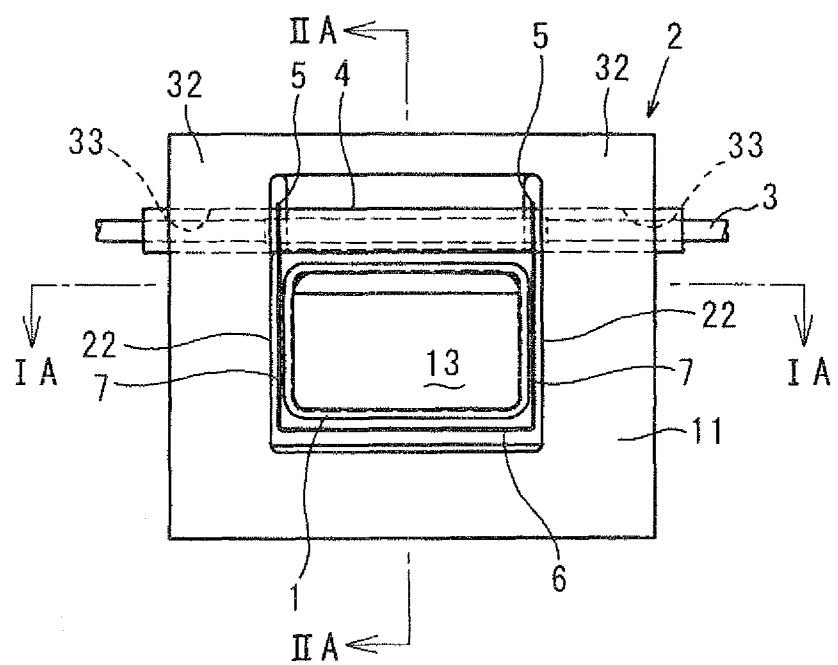
FIG. 1B is a front view showing the valve unit according to the first embodiment of the present invention.
Figure 2A:
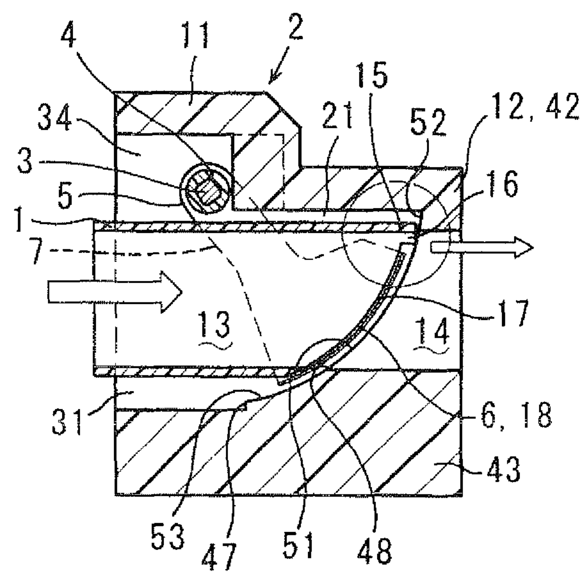
FIG. 2A is a cross-sectional view showing the valve unit according to the first embodiment of the present invention, taken along the line IIA-IIA of FIG. 1B.
Figure 2B:
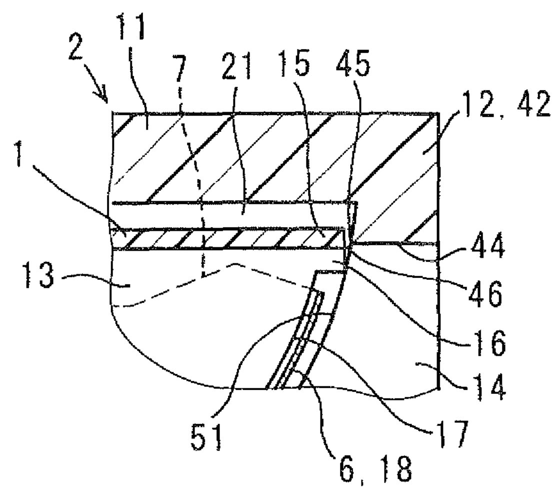
FIG. 2B is an enlarged view of FIG. 2A.

The shaft 3 is a polygonal cross-section shaft (square steel shaft, metal shaft) whose cross-section perpendicular to the rotational axis direction is a polygonal shape (e.g., square shape), and is integrally formed and made of metal. The shaft 3 is insert-molded in each shaft 4. One end portion of the shaft 3 in the rotational axis direction protrudes toward a left side from a left end surface of the shaft 4, as shown in FIG. 1B. The other end portion of the shaft 3 in the rotational axis direction protrudes toward a right side from a right end surface of the shaft 4, as shown in FIG. 1B.

An end of one side of the shaft 3 protrudes outside from the block 11 of the housing 2, and is connected to the actuator configured by the motor, the power-transmitting mechanism (gear reduction mechanism) and the like. Thus, the electric actuator can change opening degrees of the rotary valves (valve opening degrees of TCV) at one time through the shafts 3, 4.

The shaft 4 is arranged in each of the rotary valves. The shaft 4 is a cylindrical resin shaft (resin molding portion made of synthetic resin) that is formed to surround the periphery of the shaft 3 in the circumferential direction. The shaft 4 has valve supporting portions, each of which is connected (support fixation by insert molding) to each of the connecting portions 5 in each of the rotary valves. That is, the shaft 3 connected to the actuator can supports and fixes the rotary valves through the shafts 4. Therefore, the opening degrees of the rotary valves (valve opening degrees of TCV) can be changed at one time by one shaft 3.

The motor that drives the rotary valves is electrically connected to a battery mounted to a vehicle such as a motor vehicle through a motor driving circuit, which is electrically controlled by an engine control unit (ECU).

Each of the multiple rotary valves is rotatably (swingably) housed in the inner space of the housing 2. The rotary valve is a substantially U-shaped air flow control valve (swing-type rotary valve), which generates a vertical-direction swirling flow (intake-air vortex flow, tumble flow) in the combustion chamber of each of the cylinders of the engine. The rotary valves are integrally formed into predetermined shapes and are made of synthetic resin.

In a normal operation of the engine, the rotary valves are fully opened by using the actuator, specifically, the driving torque of the motor. That is, the rotary valves are controlled (driven in a fully-opening direction) such that the opening degrees of the rotary valves (valve opening degrees of TCV) are in the fully-opened state (at a fully-opened position).

The fully-opened position of each of the rotary valves indicates the fully-opened state (fully-opened posture, housed posture) in which the air flow passage 13 formed inside the duct 1 is fully-opened. Furthermore, the rotary valves may be biased in a valve-opening direction by biasing force of a spring or the like that is embedded in the actuator such that all the rotary valves are located at the fully-opened position.

In engine starting or engine idling, the rotary valves are fully closed by using the actuator, specifically, the driving torque of the motor. That is, the rotary valves are controlled (driven in a fully-closing direction) such that the opening degrees of the rotary valves (valve opening degrees of TCV) are in a fully-closed state (at a fully-closed position).

The fully-closed position of each of the rotary valves indicates the fully-closed state (fully-closed posture, opposed posture) in which the air flow passage 13 formed inside the duct 1 is fully-closed. Furthermore, the rotary valves may be biased in a valve-closing direction by the biasing force of the spring or the like that is embedded in the actuator such that all the rotary valves are located at the fully-closed position.

When the supply of electric power to the motor is stopped in an engine stoppage, the rotary valves are returned to the fully-opened position (or a middle opening-degree state in which the rotary valve is slightly closed compared with the fully-opened position, i.e., a middle position) by the biasing force of the spring or the like.

The rotary valve (the side plates 7, the valve plate 6) of the present embodiment is configured to be depart from the fully-closed position (opposed posture, fully-closed posture) in which the valve plate 6 is arranged to be opposed to the downstream end surface of the duct 1 and the air outlet of the air flow passage 13 with the first clearance interposed therebetween, in the fully-opened state of the rotary valve. That is, the rotary valve makes the housed posture (in a housed state), in which the air flow passage 13 is opened and the valve plate 6 is housed in the valve-housing concave portion 31.

The rotary valves are configured such that a rotational angle (valve opening degree) of each of the rotary valves is changed in a whole valve-operation range from the fully-opened position to the fully-closed position. In particular, by changing the rotational angle (valve opening degree) of the valve plate 6 of the rotary valve in the whole valve-operation range from the fully-opened position to the fully-closed position, the rotary valve relatively rotates with respect to the duct 1 and the block 11 to open and close the air flow passage 13. That is, the opening areas (cross-sectional areas) of the air flow passages 13, 14 formed in the duct 1 can be changed. The rotary valve of the present embodiment configures a two-positions switching valve that switches between two positions, that is, the fully-opened position at which the air flow passages 13, 14 are fully-opened and the fully-closed position at which the air flow passages 13, 14 are fully-closed.

Each of the two connecting portions 5 is formed by a ring plate made of metal, which surrounds the periphery of the shaft 3, and is supported and fixed to each of the valve supporting portions of the shaft 4 by insert molding. A square opening (fitting opening) in which the shaft 3 is fitted is formed in each of the connecting portions 5. The shafts 3, 4 and the connecting portions 5 are arranged at the upstream side in the air flow direction than the downstream end of the duct 1 (at a side of the upstream end of the duct 1).

The valve plate 6 is a connecting portion that connects free end portions (end portions opposite from the shafts) of the pair of side plates 7. The valve plate 6 reciprocates around the shafts 3, 4 in the rotational direction so as to move outside the duct 1 and along the downstream end surfaces of the side walls of the duct 1, thereby configuring a valve body (valve element of the rotary valve) that changes the opening areas of the air flow passages 13, 14. Furthermore, in the fully-closed state of the rotary valve, the valve plate 6 is arranged to be opposed to the downstream end surface of the duct 1 and the air outlet of the air flow passage 13 with the first clearance interposed therebetween. Therefore, the opening area of the air flow passage 13 formed in the duct 1 is changed in accordance with an overlapped area between the valve plate 6 and the air outlet of the air flow passage 13.

The valve plate 6 has the circular curved surface portion (circular portion) 18. The curved surface portion 18 is arranged to be opposed to the curved line portion 17 formed on the downstream end surfaces of the side walls of the duct 1 and the air outlet of the air flow passage 13 with the first clearance interposed therebetween, in the fully-closed state of the rotary valve. The curved surface portion 18 is a curved portion that has the radius of curvature centered on the shafts 3, 4. The concave curved surface, which curves along the convex curved surface of the curved line portion 17, is formed on an inner surface of the curved surface portion 18, i.e., an opposed surface of the curved surface portion 18.

The inner wall surface of the curved surface portion 18 in the curvature direction is formed on one end surface of the valve plate 6 in a plate thickness direction thereof. Furthermore, an outer wall surface of the curved surface portion 18 in the curvature direction is formed on the other end surface of the valve plate 6 in the plate thickness direction thereof.

The inner wall surface of the curved surface portion 18 in the curvature direction is arranged to be opposed to the downstream end of the duct 1 (the curved line portion 17) with the first clearance interposed therebetween, in the fully-closed state of the rotary valve. The outer wall surface of the curved surface portion 18 in the curvature direction is arranged to be opposed to a pair of opposed walls 41 of the block 12 with a second clearance interposed therebetween, in the fully-closed state of the rotary valve. The shape of the outer wall surface of the curved surface portion 18 in the curvature direction is a convex curved shape that protrudes outward in a radial direction of the shafts 3, 4.

The air flow passage 13 has the upper opening (throttle portion) 16. In the fully-closed state of the rotary valve, the upper opening 16 is located between an end portion of the curved surface portion 18 of the valve plate 6 and a passage wall surface (upper wall surface) of the canopy-shaped (substantially U-shaped) duct protrusion 15, which is formed on the downstream end surface of the upper wall of the duct 1. The upper opening 16 is formed so as to open at one side in a height direction of the air flow passage 13.

The upper opening 16, which is formed between the duct protrusion 15 of the duct 1 and the curved surface portion 18 of the valve plate 6, has a function to generate gas flow (swirling flow, tumble flow) in the combustion chamber of each of the cylinders of the engine by narrowing the cross-sectional area (opening area) of the air flow passage 13 formed in the duct 1 to be a predetermined value or less. The smaller the opening area of the upper opening 16 becomes, the stronger the swirling flow (tumble flow) that is generated in the combustion chamber of each of the cylinders of the engine can become. The end portion of the curved surface portion 18 of the valve plate 6 may be configured to have a function as a fully-closed stopper that is engaged with the duct protrusion 15 of the duct 1 in the fully-closed state of the rotary valve.

Each of the pair of side plates 7 extends straight outward in the radial direction of the shaft 3 (toward the free end portion, the end portion) from the corresponding connecting portion 5.

The pair of side plates 7 is opposed portions (opposed portions of the rotary valve). The side plates 7 are arranged to be opposed to each other with a distance interposed therebetween in the axial direction parallel to the shaft 3. Each of the side plates 7 is formed to extend outward in the radial direction of the shaft 3 (toward the free end portion) from the corresponding connecting portion 5 connected to the shaft 3.

In the whole valve-operation range from the fully-opened state (housed posture) to the fully-closed state (opposed posture) of the valve plate 6 of the rotary valve, the side plates 7 are housed in the side spaces at both sides, each of which is formed between the wall surface of the inner space of the housing 2 and the outer surface of each of the side walls of the duct 1. Furthermore, each of the side plates 7 is arranged to be opposed to the outer surface of each of the side walls of the duct 1 with a third clearance interposed therebetween.

Both ends of the valve plate 6 in a rotational axis direction (in the axial direction parallel to the shaft 3) are bent to the shaft side (connecting portion side) at substantially right angles so that the side plates 7 are formed. Each of the side plates 7 should have a flange extending toward the shaft side by more than twice the dimension of the first clearance from the outer surface of the valve plate 6. Therefore, the side plates 7 can entirely cover lateral openings of the first clearance, which is formed between the downstream end surface of the duct 1 and the air outlet of the air flow passage 13, and the valve plate 6 of the rotary valve, in the fully-closed state of the rotary valve.

The lateral openings of the first clearance open at both sides in the axial direction parallel to the shaft 3.

Next, the block 12 of the housing 2 of the present embodiment will be described in detail with reference to FIGS. 1A to 3C.

The block 12 of the housing 2 is continuously connected to the downstream end of the block 11, and extends toward the downstream side in the air flow direction from the downstream end of the block 11. The block 12 is arranged to surround the periphery of the air flow passage 14, and has a function as the nozzle that discharges the intake air, which has flowed out of the air flow passage 13 formed in the duct 1, into each of the intake ports of the cylinder head. Furthermore, the block 12 has the opposed walls (side walls) 41 which are arranged to be opposed to each other with the air flow passage 14 interposed therebetween, an upper wall 42 arranged at one side (upper side) in a height direction of the air flow passage 14, a lower wall 43 arranged at the other side (lower side) in the height direction of the air flow passage 14 and the like.

The opposed walls 41 are arranged at the downstream side in the air flow direction than the downstream end of the duct 1 (the curved line portion 17) and a moving path of the valve plate 6 of the rotary valve. The opposed walls 41 have circular opposed surfaces (opposed wall surfaces) 51 that follow a shape of the outer wall surface of the curved surface portion 18 of the valve plate 6 in the curvature direction (convex curved surface). Each of the opposed surfaces 51 has the radius of curvature centered on the shafts 3, 4. In the fully-closed state of the rotary valve, the opposed surfaces 51 are arranged to be opposed to the outer wall surface of the curved surface portion 18 of the valve plate 6 in the curvature direction (convex curved surface) with the second clearance interposed therebetween.

Each of the opposed walls 41 protrudes toward a central axis line of the air flow passage 14 from each of flow-passage wall surfaces, which are located at both sides in a width direction of the air flow passage 14.

The second clearance is formed between an inner wall surface of each of the opposed walls 41 in a curvature direction (concave curved surface) and the outer wail surface of the curved surface portion 18 in the curvature direction (convex curved surface).

The upper wall 42 has a protruding wall 44 that protrudes downward in the height direction from a level corresponding to that of the inner surface of the upper wall of the block 11. The protruding wall 44 has an edge portion (protrusion) 45, which protrudes toward the upstream side of the air flow passage 14 in the air flow direction so as to contact (adhere to) the duct protrusion 15 of the duct 1 (the downstream end of the duct 1 near the opening). The protruding wall 44 narrows a flow passage (clearance) 46 formed between the protrusion 45 and the duct protrusion 15 of the duct 1 so that air, which has leaked into the rectangular tube-shaped space formed between the outer surface of the duct 1 and the inner surface of the block 11, can be restrained from flowing into the air flow passage 14 through the flow passage 46.

The protruding wall 44 is arranged at one side (upper side) in the height direction of the air flow passage 14. A dimension between a lower end surface (flow-passage wall surface) of the protruding wall 44 and an upper end surface (flow-passage wall surface) of the lower wall 43 in the height direction is set to be substantially the same as dimensions of the air flow passages 13, 14 in the height direction. As with the opposed surfaces 51 of the opposed walls 41, the protruding wall 44 has a circular end surface (opposed surface) 52 that follows the shape of the outer wall surface of the curved surface portion 18 of the valve plate 6 in the curvature direction (convex curved surface).

The lower wall 43 is thicker than the upper wall 42 of the block 12. A stepped portion 47 is formed between the upper end surface of the lower wall 43 (bottom surface) and the upper end surface of the lower wall 43 in the block 11 (bottom surface). Furthermore, the lower wall 43 has a circular bottom surface (opposed surface) 53 that follows the shape of the outer wall surface of the curved surface portion 18 of the valve plate 6 in the curvature direction (convex curved surface) between the stepped portion 47 and an inlet of the air flow passage 14 (indicated by a ridge line 48).

Next, a function of the air intake device for an internal combustion engine, in particular, the valve unit of the present embodiment will be described with reference to FIGS. 1A to 3C.

When an ignition switch is turned on (IG/ON), the ECU controls energization of the motor of the electronic throttle device and drives an ignition device (ignition coil, spark plug and the like) and a fuel injection device (electric fuel pump, injector and the like) so that engine operation is started. When a specific cylinder of the engine changes from an exhaust stroke to an intake stroke, in which the intake valve is opened and the piston is pushed downward, a negative pressure (pressure lower than the atmospheric pressure) in the combustion chamber of the cylinder becomes large in accordance with pushing down of the piston, and mixture gas is drawn into the combustion chamber from the opened intake port.

When the engine is cooled and a large amount of intake air is not required, that is, in the engine starting or the engine idling, the ECU controls the supply of electric power to the motor that drives the rotary valves through the shaft 3 (e.g., energization of the motor). The rotary valves are driven in the valve-closing direction by using the driving torque of the motor at this time, and thus, each of the valve plates 6 of the rotary valves is closed. That is, the ECU controls such that the rotary valve makes the fully-closed posture (fully-closed state) in which the valve plate 6 is arranged to be opposed to the downstream end surface of the duct 1 and the air outlet of the air flow passage 13 with the first clearance interposed therebetween.

In this case, most of the intake air, which has flowed out of the air outlet of the air flow passage 13 formed in the duct 1, flows along the concave curved surface of the curved surface portion 18 of the valve plate 6, and passes through the upper opening 16, which is formed between the passage wall surface of the canopy-shaped duct protrusion 15 formed on the downstream end surface of the upper wall of the duct 1 and the curved surface portion 18 of the valve plate 6. The intake air which has passed through the upper opening 16 is conducted into an upper layer of the intake port of the cylinder head from the air outlet of the air flow passage 14 formed in the block 12 of the housing 2, and then, flows along an upper wall surface of the upper layer of the intake port. An air flow, which flows along the upper wall surface of the upper layer of the intake port is supplied to the combustion chamber from an intake orifice of the intake port (port opening). At this time, the swirling flow (tumble flow) is generated in the combustion chamber of each of the cylinders of the engine. Therefore, combustion efficiency in the combustion chamber in the engine starting or the engine idling is improved, and fuel consumption, emission (e.g., HC reduction effect) and the like are improved.

In contrast, when the engine is warmed and a large amount of intake air is required, that is, in the normal operation of the engine, the ECU controls the supply of electric power to the motor that drives the rotary valves through the shaft 3 (e.g., energization of the motor). The rotary valves are driven in the valve-opening direction by using the driving torque of the motor at this time, and thus, each of the valve plates 6 of the rotary valves is opened. That is, the ECU controls such that the rotary valve is depart from the fully-closed posture (fully-closed state), in which the valve plate 6 is arranged to be opposed to the downstream end surface of the duct 1 and the air outlet of the air flow passage 13 with the first clearance interposed therebetween, and makes the housed posture (in a housed state, fully-opened state), in which the air flow passage 13 is opened and the valve plate 6 is housed in the valve-housing concave portion 31 formed between a block bottom wall of the housing 2 and the lower wall of the duct 1.

In this case, an air flow, which flows from the air flow passage 13 formed in the duct 1 into the air flow passage 14 formed in the block 12, passes straight through the air flow passages 13, 14 and is conducted into the intake port of the cylinder head from the air outlet of the air flow passage 14 of the block 12. The air flow which has passed through the intake port is supplied to the combustion chamber from the intake orifice of the intake port (port opening). At this time, a vertical-direction swirling flow (tumble flow) is not generated in the combustion chamber of each of the cylinders of the engine.

The valve unit of the present embodiment is configured such that the valve plate 6 is housed in the valve-housing concave portion 31 formed outside the air flow passages 13, 14 (at the lower side in the vertical direction of the vehicle), in the fully-opened state of the rotary valve. The valve unit is arranged such that the duct 1 and the air flow passage 13 pass through the inner side of the rotary valve (space surrounded by the valve plate 6 and the side plates 7). That is, the rotary valve is arranged outside the air flow passages 13, 14 of the housing 2 (at both sides in the horizontal direction and the lower side in the vertical direction of the vehicle).

Therefore, in the fully-opened state of the rotary valve, the air flow, which has flowed into the air flow passages 13, 14, passes straight through the air flow passages 13, 14 without being blocked by the valve plate 6 and the side plates 7 of the rotary valve. That is, the air flow, which has flowed into the air flow passage 13 formed in the duct 1, flows straight through the air flow passages 13, 14, and is conducted into the combustion chamber of each of the cylinders of the engine from the air outlet of the air flow passage 14 (the downstream end of the block 12) via the intake port of the cylinder head. Therefore, resistance of the intake air which passes through the air flow passages 13, 14 can be reduced in the fully-opened state of the rotary valve.

As described above, in the valve unit of the present embodiment, the duct 1 has the curved line portion 17 having the radius of curvature centered on the shafts 3, 4 at the downstream end of the duct 1 (the side walls of the duct 1).

In the fully-closed state of the rotary valve, the outer wall surface of the curved line portion 17 of the duct 1 in the curvature direction (convex curved surface) is opposed to the inner wall surface of the curved surface portion 18 of the valve plate 6 of the rotary valve in the curvature direction (concave curved surface) with the first clearance interposed therebetween.

The lateral openings of the first clearance are respectively covered by the side plates 7 of the rotary valve.

Thus, in the fully-closed state of the rotary valve, the intake air can be restrained from leaking from the entire periphery of the valve plate 6 of the rotary valve.

The rectangular tube-shaped block 12 that conducts the intake air, which has flowed out of the downstream end of the duct 1, to the intake port of each of the cylinders of the engine has the pair of opposed walls 41. The opposed walls 41 are opposed to each other with the air flow passage 14 interposed therebetween. The opposed walls 41 have circular opposed surfaces 51 that follow the shape of the outer wall surface of the curved surface portion 18 of the valve plate 6 of the rotary valve in the curvature direction (convex curved surface).

Furthermore, in the fully-closed state of the rotary valve, each of the opposed surfaces 51 of the opposed walls 41 is opposed to the outer wall surface of the curved surface portion 18 of the valve plate 6 of the rotary valve in the curvature direction (convex curved surface) with the second clearance interposed therebetween.

Thus, the second clearance becomes narrower compared to that of the related art. Therefore, it becomes difficult for the air which has leaked into the rectangular tube-shaped space formed between the outer surface of the duct 1 and the inner surface of the block 11 from the first and third clearances around the rotary valve, in particular, the air which has leaked into the side clearance 22 to pass through the second clearance. Furthermore, it becomes difficult for the air which has leaked into the side clearance 22 to flow into a side of the air flow passage .14.

The protruding wall 44 of the block 12 has the protrusion 45, which protrudes toward the upstream side of the air flow passage 14 in the air flow direction so as to contact (adhere to) the duct protrusion 15 of the duct 1 (the downstream end of the duct 1 near the opening). Thus, a width of the flow passage formed between the duct protrusion 15 on the upper wall of the duct 1 and the protrusion 45 is narrowed.

That is, the flow passage 46 is narrower than that of the related art. Therefore, it becomes difficult for the leaked air which has leaked into the rectangular tube-shaped space formed between the outer surface of the duct 1 and the inner surface of the block 11 from the first and third clearances around the rotary valve, in particular, the leaked air which has leaked into the top clearance 21 to pass through the flow passage 46. Furthermore, it becomes difficult for the leaked air which has leaked into the top clearance 21 to flow into a side of the air flow passage 14.

Therefore, in the fully-closed state of the rotary valve, generation of an air flow other than a main flow of the intake air, which has flowed into the air flow passage 14 formed between the opposed wails 41 of the block 12 from the upper opening 16, can be suppressed.

Accordingly, in the fully-closed state of the rotary valve, the main flow of the intake air, which has flowed into the air flow passage 14 from the upper opening 16, is made less likely to be affected by the leaked air. Thus, a straight flow (localized flow) of the intake air, which has flowed into the air flow passage 14 from the upper opening 16, can be restrained from spreading, and a flow rate of the localized flow can be restrained from slowing down.

Therefore, the straight flow (localized flow) can be generated in the intake port of the cylinder head efficiently. That is, an effect by generation of the localized flow can be obtained.

As described above, in the fully-closed state of the rotary valve, the intake air, which has flowed into the air flow passage 14 from the air flow passage 13 through the upper opening 16, flows into the intake port of the cylinder head. At this time, in the intake port of the cylinder head, the straight flow (localized flow) that is biased toward one side (upper layer side) in a height direction of the intake port is generated. That is, the intake air, which flows toward the intake port of the cylinder head from the upper opening 16 via the air flow passage 14, can be concentrated at the one side (upper layer side) in the height direction of the intake port efficiently, and thereby, the straight flow (localized flow) can be generated in the intake port of the cylinder head efficiently. When the straight flow (localized flow) flows into the combustion chamber of each of the cylinders of the engine through the intake port, the swirling flow (tumble flow) that is generated in the combustion chamber of each of the cylinders of the engine is intensified.

In the valve unit of the present embodiment, the swirling flow (tumble flow) that is generated in the combustion chamber of each of the cylinders of the engine can be intensified, and therefore, a strong tumble flow can be generated.

(Second Embodiment)

Figure 4A:
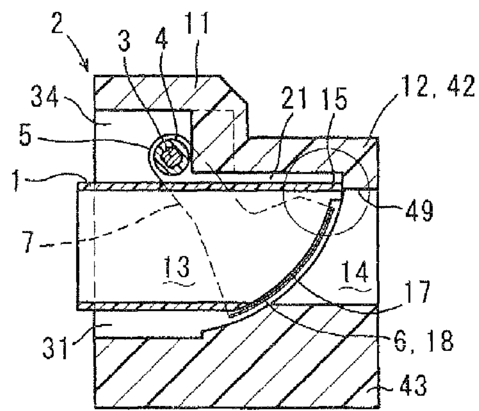
FIG. 4A is a cross-sectional view showing a valve unit according to a second embodiment of the present invention.
Figure 4B:
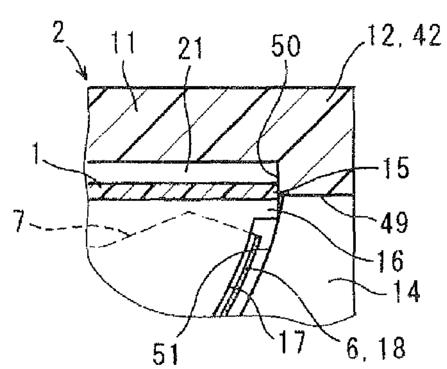
FIG. 4B is an enlarged view of FIG. 4A.
Figure 5:
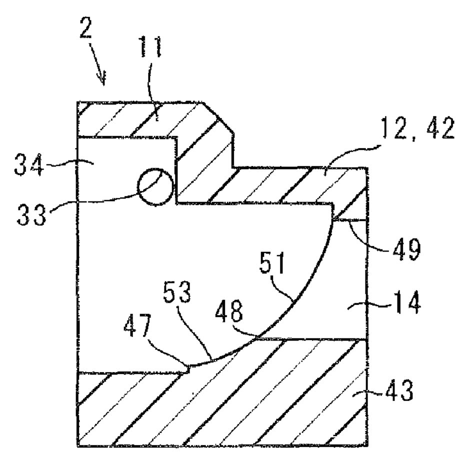
FIG. 5 is a cross-sectional view showing a housing according to the second embodiment of the present invention.

The second embodiment of the present invention is described with reference to FIGS. 4A to 5. FIGS. 4A and 4B show a valve unit (TCV), and FIG. 5 shows a housing.

In the valve unit of the present embodiment, the duct 1 is inserted in and supported by the housing 2.

The housing 2 has the rectangular tube-shaped block 11, which is arranged to surround the periphery of the duct 1 in the circumferential direction, the rectangular tube-shaped block 12, which extends toward the downstream side (a side of the intake port) in the air flow direction than the downstream end of the block 11, and the like.

The upper wall 42 of the block 12 has a protruding wall (protrusion) 49, which protrudes toward the upstream side of the air flow passage 14 in the air flow direction so as to contact (adhere to) the duct protrusion 15 of the duct 1 (the downstream end of the duct 1 near the opening).

In the present embodiment, an end portion of the protruding wall 49 adheres to the downstream end of the duct 1 near the opening (the duct protrusion 15 on the upper wall of the duct 1). An end surface (opposed surface) of the protruding wall 49 is a vertical surface 50, which is perpendicular to an axial direction of the main flow of the intake air (the air flow direction) in the air flow passage 14.

As described above, in the valve unit (TCV) having the substantially U-shaped rotary valve, the similar effect to the first embodiment can be obtained.

(Third Embodiment)

Figure 6A:
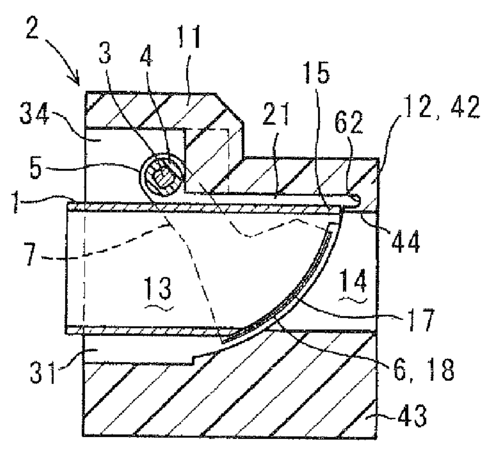
FIG. 6A is a cross-sectional view showing a valve unit according to a third embodiment of the present invention.
Figure 6B:
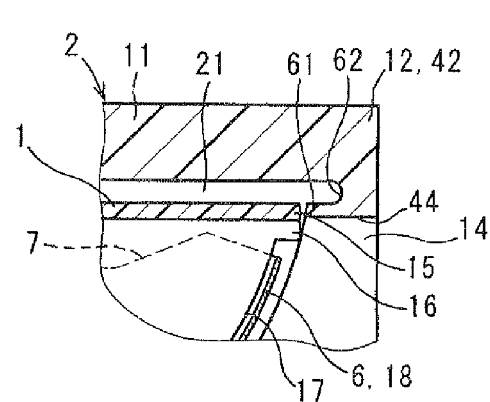
FIG. 6B is an enlarged view of FIG. 6A.
Figure 7:
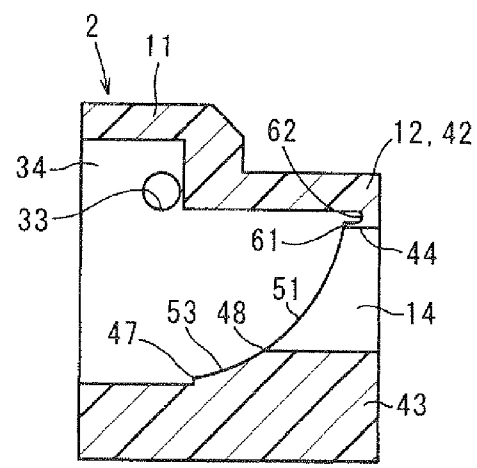
FIG. 7 is a cross-sectional view showing a housing according to the third embodiment of the present invention.

The third embodiment of the present invention is described with reference to FIGS. 6A to 7. FIGS. 6A and 6B show a valve unit (TCV), and FIG. 7 shows a housing.

In the valve unit of the present embodiment, the duct 1 is inserted in and supported by the housing 2.

The housing 2 has the rectangular tube-shaped block 11, which is arranged to surround the periphery of the duct 1 in the circumferential direction, the rectangular tube-shaped block 12, which extends toward the downstream side (a side of the intake port) in the air flow direction than the downstream end of the block 11, and the like.

The upper wall 42 of the block 12 has the protruding wall 44 that protrudes downward in the height direction from a wall surface of the upper wall 42 of the block 12. The protruding wall 44 has a protrusion 61, which protrudes toward the upstream side of the air flow passage 14 in the air flow direction so as to contact (adhere to) the duct protrusion 15 of the duct 1 (the downstream end of the duct 1 near the opening).

The protruding wall 44 of the block 12 has a recess 62, which is dented toward a side of the intake port of the cylinder head (i.e., toward a downstream side of the air flow passage 14 in the air flow direction), outside the protrusion 61 (upper side in the height direction of the air flow passage 14). The recess 62 is formed on an opposed surface (inner surface that is opposed to the rectangular tube-shaped space) of the upper wall 42 of the block 12 in the whole width direction thereof.

Thus, the leaked air, which has leaked into the rectangular tube-shaped space formed between the outer surface of the duct 1 and the inner surface of the block 11, in particular, into the top clearance 21, flows into the recess 62. Therefore, it becomes difficult for the leaked air which has leaked into the top clearance 21 to flow into a side of the air flow passage 14.

Accordingly, the main flow of the intake air, which has flowed into the air flow passage 14 from the upper opening 16, is made less likely to be affected by the leaked air. Thus, a straight flow (localized flow) of the intake air, which has flowed into the air flow passage 14 from the upper opening 16, can be restrained from spreading, and a flow rate of the localized flow can be restrained from slowing down.

Therefore, the straight flow (localized flow) can be generated in the intake port of the cylinder head efficiently. That is, an effect by generation of the localized flow can be obtained.

As described above, in the valve unit (TCV) having the substantially U-shaped rotary valve, the similar effect to the first and second embodiments can be obtained.

(Fourth Embodiment)

Figure 8A:
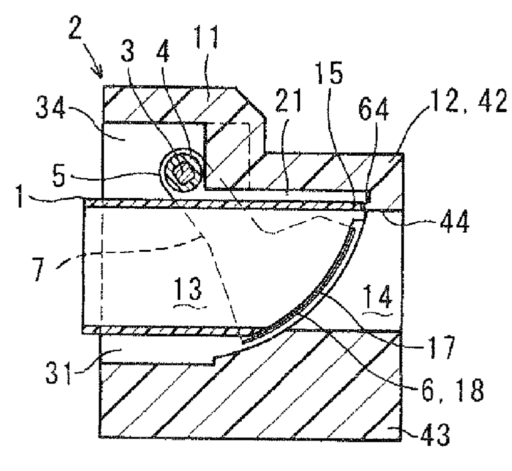
FIG. 8A is a cross-sectional view showing a valve unit according to a fourth embodiment of the present invention.
Figure 8B:
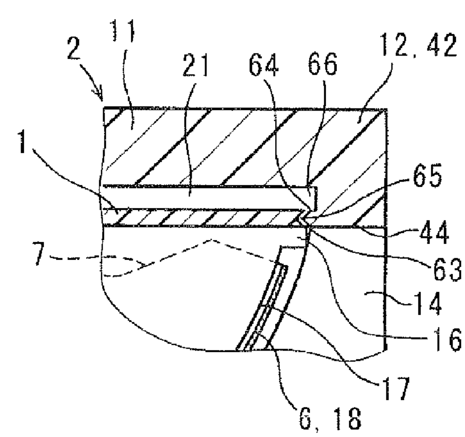
FIG. 8B is an enlarged view of FIG. 8A.
Figure 9:
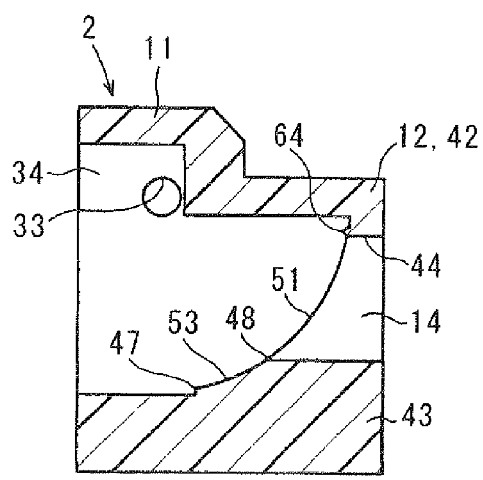
FIG. 9 is a cross-sectional view showing a housing according to the fourth embodiment of the present invention.

The fourth embodiment of the present invention is described with reference to FIGS. 8A to 9. FIGS. 8A and 8B show a valve unit (TCV), and FIG. 9 shows a housing.

In the valve unit of the present embodiment, the duct 1 is inserted in and supported by the block 11 of the housing 2.

The housing 2 has the rectangular tube-shaped block 11, which is arranged to surround the periphery of the duct 1 in the circumferential direction, the rectangular tube-shaped block 12, which extends toward the downstream side (a side of the intake port) in the air flow direction than the downstream end of the block 11, and the like.

The upper wall 42 of the block 12 has the protruding wall 44 that protrudes downward in the height direction from a wall surface of the upper wall 42 of the block 12. A clearance having a maze structure is formed adjacent to the protruding wall 44 by a flexed flow passage 63.

The flow passage 63 is formed between a triangular protrusion 64, which protrudes toward the upstream side of the air flow passage 14 in the air flow direction from an opposed surface of the protruding wall 44, and a V-shaped groove 65, which is formed on an end surface of the duct protrusion 15 of the duct 1 (the downstream end of the duct 1 near the opening).

The protruding wall 44 of the block 12 has a recess 66, which is dented toward a side of the intake port of the cylinder head, outside the protrusion 64 (upper side in the height direction of the air flow passage 14).

Thus, the leaked air, which has leaked into the rectangular tube-shaped space formed between the outer surface of the duct 1 and the inner surface of the block 11, in particular, into the top clearance 21, flows into the recess 66. Furthermore, the clearance having the maze structure (flow passage for the leaked air) is formed by the flexed flow passage 63, and thereby it becomes difficult for the leaked air which has leaked into the top clearance 21 to pass through the flow passage 63. Therefore, it becomes difficult for the leaked air which has leaked into the top clearance 21 to flow into a side of the air flow passage 14.

Accordingly, the main flow of the intake air, which has flowed into the air flow passage 14 from the upper opening 16, is made less likely to be affected by the leaked air. Thus, a straight flow (localized flow) of the intake air, which has flowed into the air flow passage 14 from the upper opening 16, can be restrained from spreading, and a flow rate of the localized flow can be restrained from slowing down.

Therefore, the straight flow (localized flow) can be generated in the intake port of the cylinder head efficiently. That is, an effect by generation of the localized flow can be obtained.

As described above, in the valve unit (TCV) having the substantially U-shaped rotary valve, the similar effect to the first to third embodiments can be obtained.

(Fifth Embodiment)

Figure 10A:
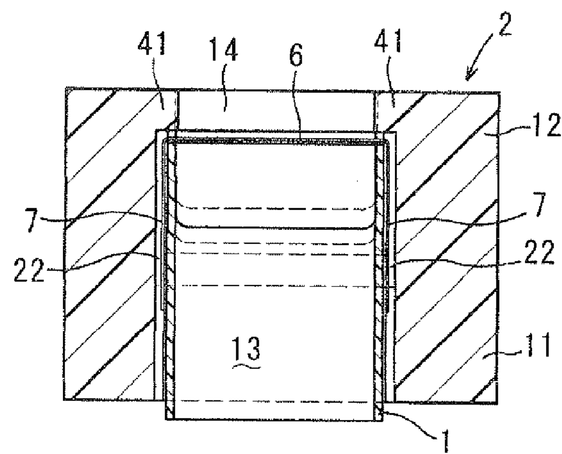
FIG. 10A is a cross-sectional view showing a valve unit according to a fifth embodiment of the present invention.
Figure 10B:
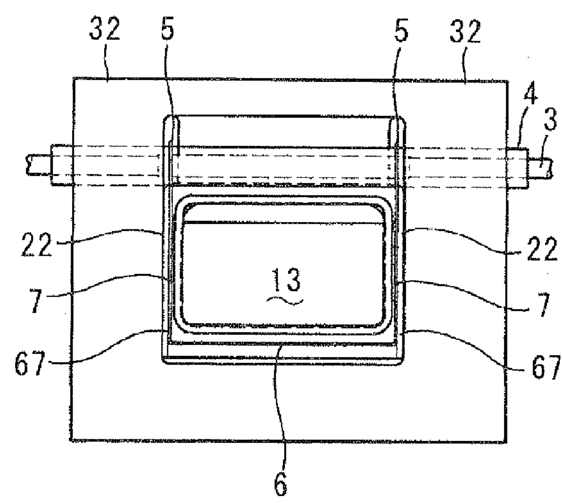
FIG. 10B is a front view showing the valve unit according to the fifth embodiment of the present invention.
Figure 10C:
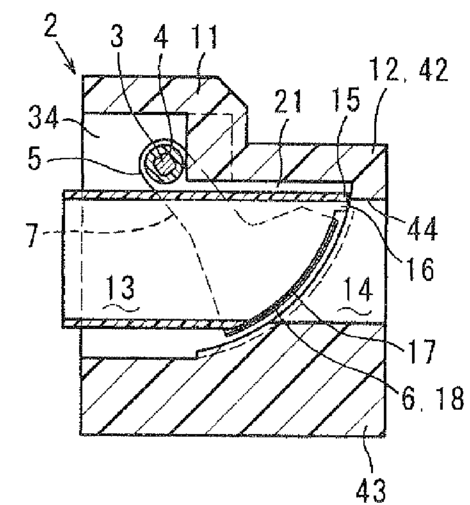
FIG. 10C is a cross-sectional view showing the valve unit according to the fifth embodiment of the present invention.
Figure 11A:
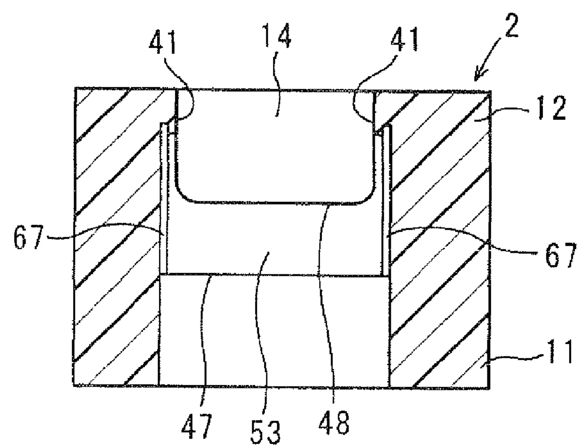
FIG. 11A is a cross-sectional view showing a housing according to the fifth embodiment of the present invention, taken along the line XIA-XIA of FIG. 11B.
Figure 11B:
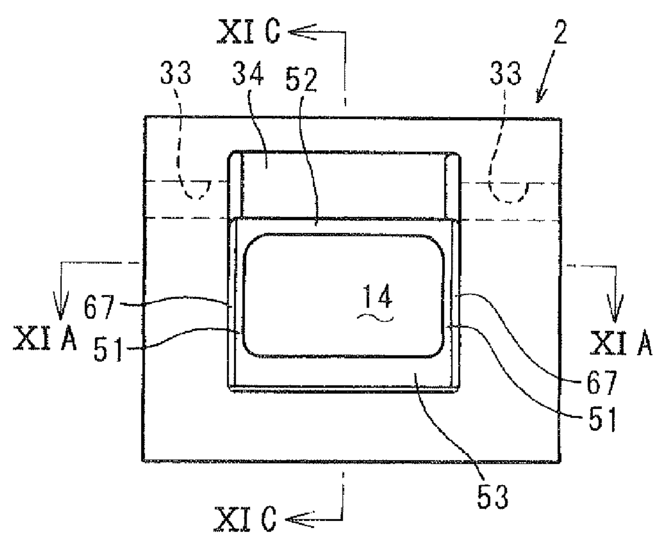
FIG. 11B is a front view showing the housing according to the fifth embodiment of the present invention.
Figure 11C:
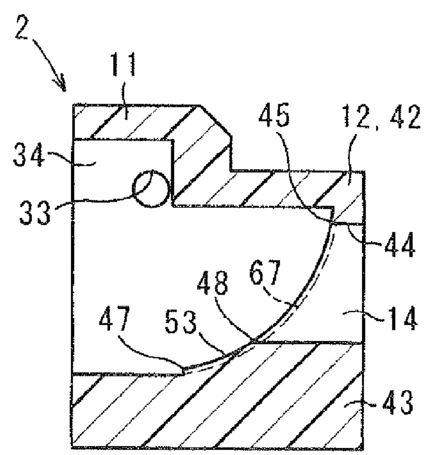
FIG. 11C is a cross-sectional view showing the housing according to the fifth embodiment of the present invention, taken along the line XIC-XIC of FIG. 118.

The fifth embodiment of the present invention is described with reference to FIGS. 10A to 11C. FIGS. 10A to 10C show a valve unit (TCV), and FIGS. 11A to 11C show a housing.

In the valve unit of the present embodiment, the duct 1 is inserted in and supported by the housing 2.

The housing 2 has the rectangular tube-shaped block 11, which is arranged to surround the periphery of the duct 1 in the circumferential direction, the rectangular tube-shaped block 12, which extends toward the downstream side (a side of the intake port) in the air flow direction than the downstream end of the block 11, and the like.

The block 12 has the pair of opposed walls 41, the upper wall 42, the lower wall 43, and the like.

Furthermore, grooves 67 are formed in the opposed surfaces 51 of the opposed walls 41 and the opposed surface 53 of the lower wall 43 of the block 12, and thereby, a clearance having a maze structure (flow passage for the leaked air) is formed between the outer wall surface of the curved surface portion 18 of the valve plate 6 in the curvature direction (convex curved surface) and the opposed surfaces 51, 53. The grooves 67 are formed at positions corresponding to both end edges of the outer wall surface of the curved surface portion 18 of the valve plate 6 in the curvature direction (convex curved surface).

The clearance having the maze structure (flow passage for the leaked air) is formed between the outer wall surface of the curved surface portion 18 of the valve plate 6 in the curvature direction (convex curved surface) and the opposed surfaces 51, 53, and thereby, it becomes difficult for the leaked air which has leaked into the side clearance 22 to pass through the second clearance. Therefore, it becomes difficult for the leaked air which has leaked into the side clearance 22 to flow into a side of the air flow passage 14.

Therefore, in the fully-closed state of the rotary valve, generation of an air flow other than a main flow of the intake air, which has flowed into the air flow passage 14 formed between the opposed walls 41 of the block 12 from the upper opening 16, can be suppressed.

Therefore, the straight flow (localized flow) can be generated in the intake port of the cylinder head efficiently. That is, an effect by generation of the localized flow can be obtained.

As described above, in the valve unit (TCV) having the substantially U-shaped rotary valve, the similar effect to the first to fourth embodiments can be obtained.

(Sixth Embodiment)

Figure 12A:
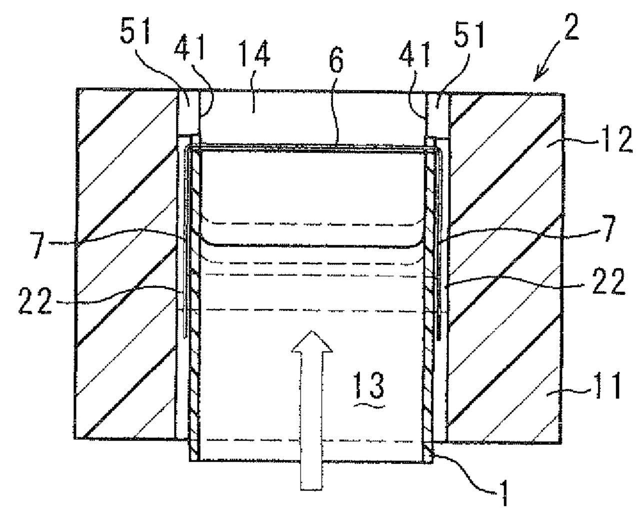
FIG. 12A is a cross-sectional view showing a valve unit according to a sixth embodiment of the present invention, taken along the line XIIA-XIIA of FIG. 12B.
Figure 12B:
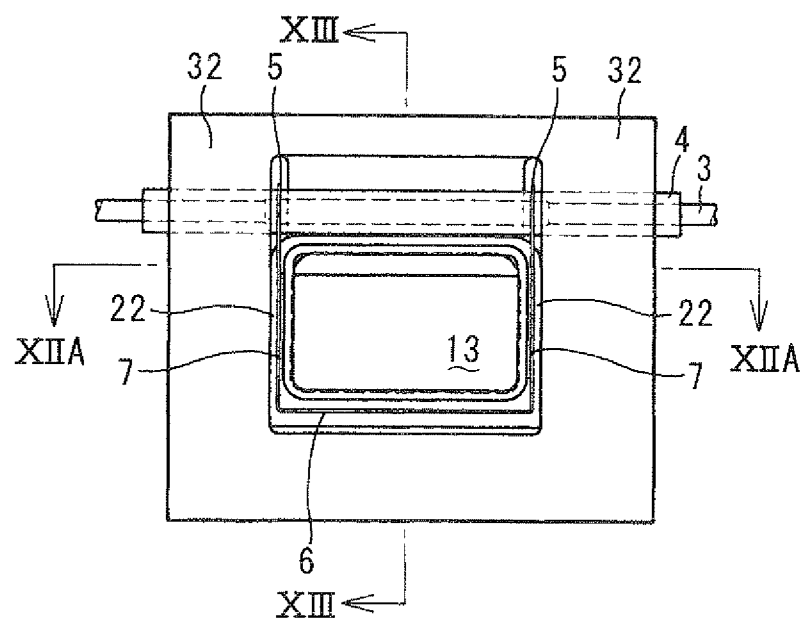
FIG. 12B is a front view showing the valve unit according to the sixth embodiment of the present invention.
Figure 13:
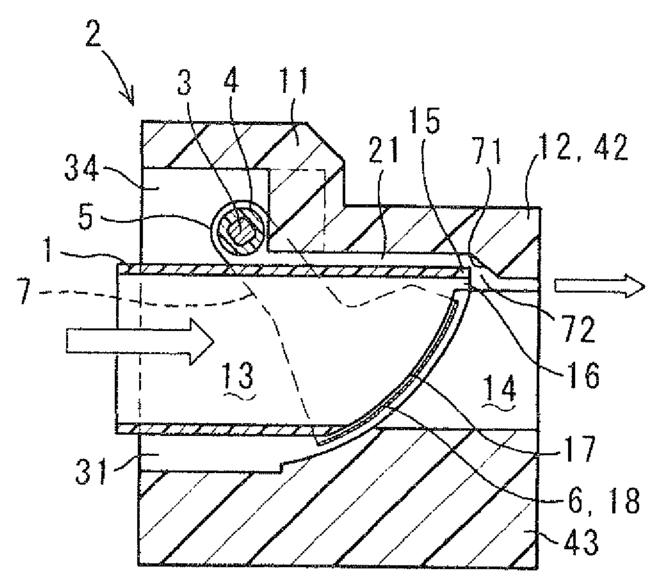
FIG. 13 is a cross-sectional view showing the valve unit according to the sixth embodiment of the present invention, taken along the line XIII-XIII of FIG. 12B.
Figure 14A:
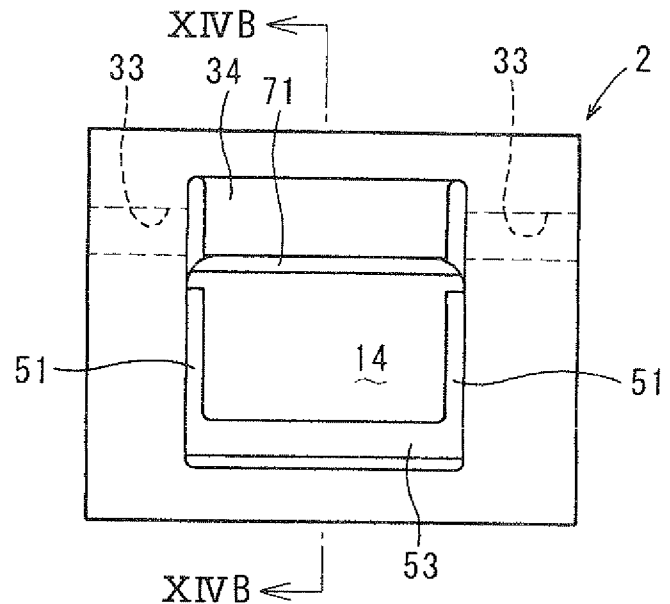
FIG. 14A is a front view showing a housing according to the sixth embodiment of the present invention.
Figure 14B:
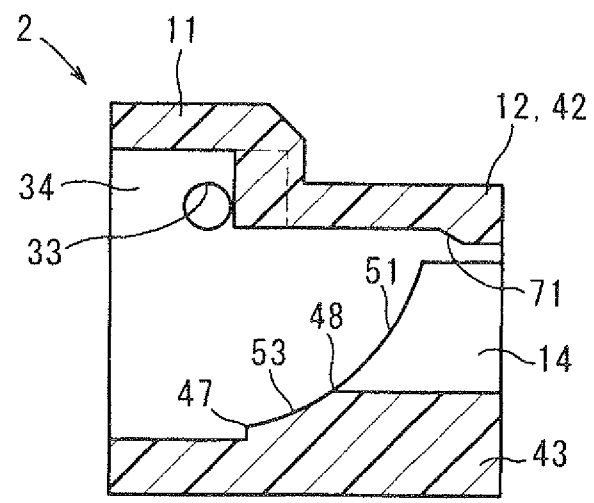
FIG. 14B is a cross-sectional view showing the housing according to the sixth embodiment of the present invention, taken along the line XIVB-XIVB of FIG. 14A.

The sixth embodiment of the present invention is described with reference to FIGS. 12A to 14B. FIGS. 12A to 13 show a valve unit (TCV), and FIGS. 14A and 14B show a housing.

In the valve unit of the present embodiment, the duct 1 is inserted in and supported by the housing 2.

The housing 2 has the rectangular tube-shaped block 11, which is arranged to surround the periphery of the duct 1 in the circumferential direction, the rectangular tube-shaped block 12, which extends toward the downstream side (a side of the intake port) in the air flow direction than the downstream end of the block 11, and the like.

The block 12 has the pair of opposed walls 41, the upper wall 42, the lower wall 43, and the like.

The upper wall 42 has a flow-passage wall surface 71. The flow-passage wall surface 71 is gently slanted so as to come close to the axial direction (flow direction of the main flow of the intake air, i.e., direction indicated by the arrow in the drawings) of the main flow of the intake air, which has passed through the upper opening 16, in the fully-closed state of the rotary valve. The flow-passage wall surface 71 of the upper wall 42 is arranged at the downstream side in the air flow direction than the downstream end of the duct 1, and a flow passage 72 for the leaked air is formed between the flow-passage wall surface 71 and the upper wall of the duct protrusion 15 of the duct 1 (the downstream end of the duct 1).

Thus, when the leaked air, which has leaked into the rectangular tube-shaped space formed between the outer surface of the duct 1 and the inner surface of the block 11, in particular, into the top clearance 21, merges into the main flow of the intake air, which has passed through the upper opening 16 and flows through the air flow passage 14, a vector of the flow direction of the main flow of the intake air is made into a vector toward a substantially horizontal direction. Here, the horizontal direction is a direction perpendicular to the height direction of the air flow passage 14.

According to the related art, a vector of the flow direction of the leaked air, which has leaked from the top clearance 121 and flows into the air flow passage through the flow passage for the leaked air, is a downward vector perpendicular to a vector toward a horizontal direction. Thus, a straight flow (localized flow) of the intake air, which has flowed into the air flow passage from the opening, may be spread, and thereby a tumble flow may be weakened. In contrast, in the present embodiment, a vector of the flow direction of the main flow of the intake air, which has passed through the upper opening 16 and flows through the air flow passage 14, becomes a vector toward the substantially horizontal direction due to the leaked air, which has flowed out of the top clearance 21 and flows into the air flow passage 14 through the flow passage 72 for the leaked air. Thus, weakening of a tumble flow can be suppressed.

In addition, the leaked air, which has flowed out of the top clearance 21 and flows into the air flow passage 14 through the flow passage 72 for the leaked air, passes through the flow passage 72 for the leaked air so as to flow along the flow-passage wall surface 71 and the flow-passage wall surface of the upper wall 42 (lower end surface). At this time, the main flow of the intake air, which has passed through the upper opening 16 and flows through the air flow passage 14, is drawn by the leaked air, which flows along the flow-passage wall surface 71 and the flow-passage wall surface of the upper wall 42, and is discharged to the upper layer of the intake port of the cylinder head through the one side (upper side) in the height direction of the air flow passage 14.

As described above, in the valve unit (TCV) having the substantially U-shaped rotary valve, the similar effect to the first to fifth embodiments can be obtained. In addition, the swirling flow (tumble flow) that is generated in the combustion chamber of each of the cylinders of the engine can be intensified, and therefore, a strong tumble flow can be generated.

(Seventh Embodiment)

Figure 15:
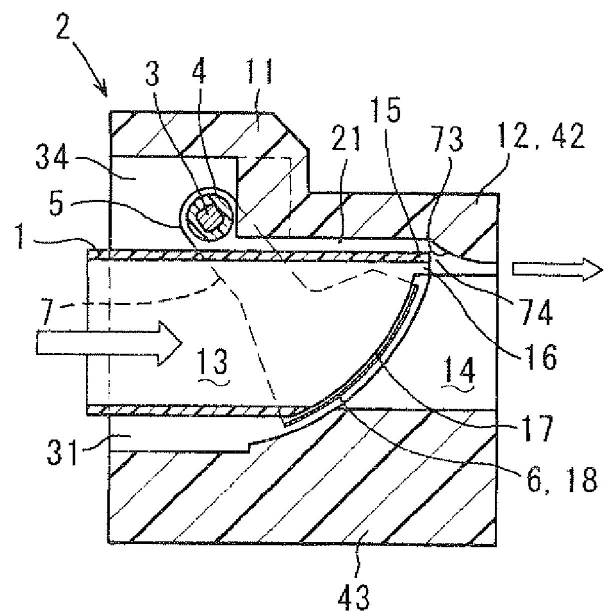
FIG. 15 is a cross-sectional view showing a valve unit according to a seventh embodiment of the present invention.
Figure 16:
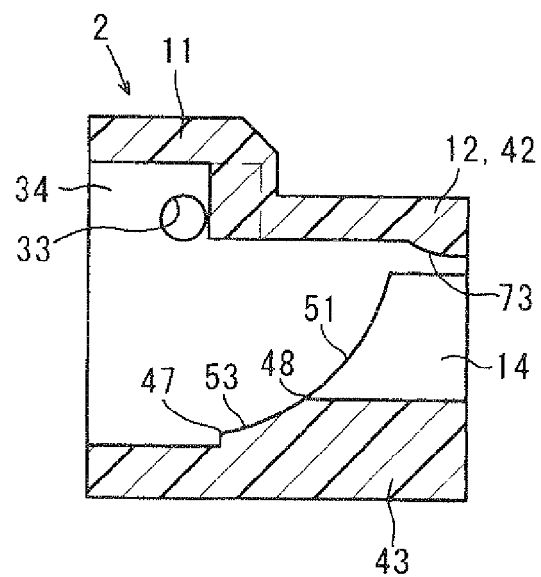
FIG. 16 is a cross-sectional view showing a housing according to the seventh embodiment of the present invention.
Figure 17A:
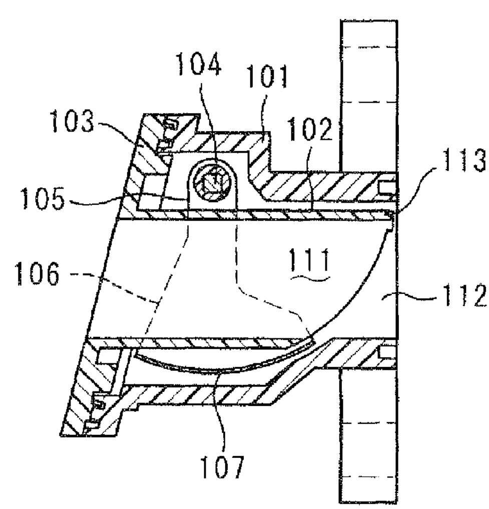
FIG. 17A is an explanatory view showing a fully-opened position of a rotary valve according to a related art.
Figure 17B:
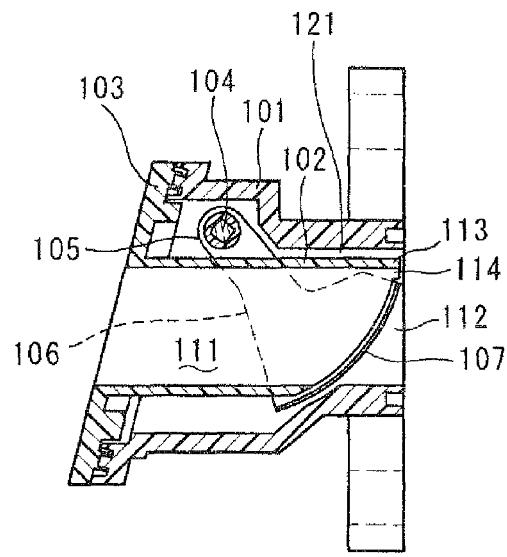
FIG. 17B is an explanatory view showing a fully-closed position of the rotary valve according to the related art.
Figure 18A:
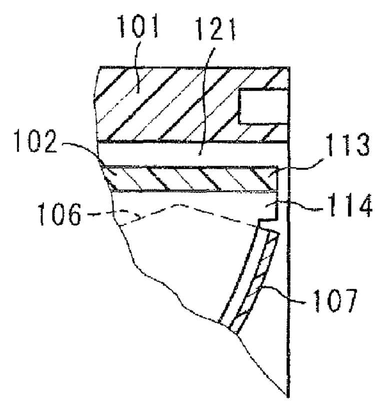
FIGS. 18A and 18B are explanatory views showing an opening formed between a downstream end of a duct and a valve plate, in a fully-closed state of the rotary valve, according to the related art.
Figure 18B:
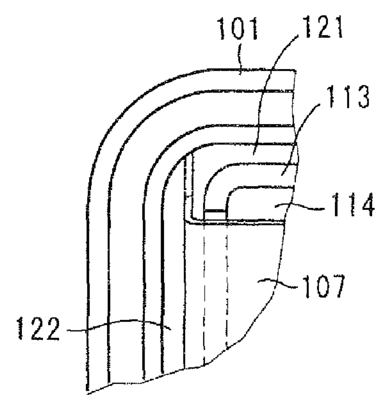

The seventh embodiment of the present invention is described with reference to FIGS. 15 and 16. FIG. 15 shows a valve unit (TCV), and FIG. 16 shows a housing.

In the valve unit of the present embodiment, the duct 1 is inserted in and supported by the housing 2.

The housing 2 has the rectangular tube-shaped block 11, which is arranged to surround the periphery of the duct 1 in the circumferential direction, the rectangular tube-shaped block 12, which extends toward the downstream side (a side of the intake port) in the air flow direction than the downstream end of the block 11, and the like.

The block 12 has the pair of opposed walls 41, the upper wall 42, the lower wall 43, and the like.

The upper wall 42 has a flow-passage wall surface 73. The flow-passage wall surface 73 is gently curved so as to come close to the axial direction (flow direction of the main flow of the intake air, i.e., direction indicated by the arrow in the drawings) of the main flow of the intake air, which has passed through the upper opening 16, in the fully-closed state of the rotary valve. The flow-passage wall surface 73 of the upper wall 42 is arranged at the downstream side in the air flow direction than the downstream end of the duct 1, and a flow passage 74 for the leaked air is formed between the flow-passage wall surface 73 and the upper wall of the duct protrusion 15 of the duct 1 (the downstream end of the duct 1).

Thus, when the leaked air, which has leaked into the rectangular tube-shaped space formed between the outer surface of the duct 1 and the inner surface of the block 11, in particular, into the top clearance 21, merges into the main flow of the intake air, which has passed through the upper opening 16 and flows through the air flow passage 14, a vector of the flow direction of the main flow of the intake air is made into a vector toward the substantially horizontal direction.

As described above, in the valve unit (TCV) having the substantially U-shaped rotary valve, the similar effect to the sixth embodiment can be obtained.

(Modified Embodiments)

In the above embodiments, the air intake device for an internal combustion engine of the present invention is configured such that a vertical-direction swirling flow (tumble flow) for promoting combustion of mixture gas in the combustion chamber of each of the cylinders of the engine can be generated. However, the air intake device for an internal combustion engine of the present invention may be configured such that a lateral-direction swirling flow (swirl flow) for promoting combustion of mixture gas in the combustion chamber of each of the cylinders of the engine can be generated. Furthermore, the air intake device for an internal combustion engine of the present invention may be configured such that a squish for promoting combustion of the engine can be generated.

In the above embodiments, the actuator that drives the rotary valve through the shafts 3, 4 is configured by the motor and the power-transmitting mechanism (for example, the gear reduction mechanism). However, the actuator that drives the rotary valve may be configured by a negative-pressure-operated actuator having an electromagnetic or electric negative-pressure control valve.

The rotating shafts of the rotary valves may be driven by separate actuators.

As the internal combustion engine, a single-cylinder engine may be used in place of the multicylinder engine.

Furthermore, the rotating shaft that supports and fixes the rotary valve may be configured by one metal shaft or one synthetic-resin shaft.

In the above embodiments, the housing 2 is integrally formed and made of resin material. However, the housing 2 may be divided into two blocks, and each block may be integrally formed and made of resin material or metal material. Furthermore, the block 12 having the opposed walls 41, the upper wall 42, the lower wall 43 and the like may be integrally formed with the cylinder head.

In the above embodiments, although the duct 1 is integrally formed and made of resin material, the duct 1 may be integrally formed and made of metal material.

In the above embodiments, although the substantially U-shaped rotary valve is integrally formed and made of metal material, the substantially U-shaped rotary valve may be integrally formed and made of resin material.

In the above embodiments, the upper opening 16 is formed at one side (upper side) in the height direction of the air flow passage 13. However, an opening, which generates a localized flow in the intake port of the internal combustion engine so that a swirling flow is generated in the combustion chamber of the internal combustion engine, may be formed at one side in the width direction of the air flow passage 13. Moreover, by cutting a part of an upper end edge of the valve plate 6, an opening, which generates a localized flow in the intake port of the internal combustion engine, may be formed.

In the above embodiments, an upstream-side open end of the block 11 of the housing 2 is air-tightly closed (blocked) by the connecting flange portion of the duct 1. However, the upstream-side open end of the block 11 of the housing 2 may be air-tightly blocked by a cover that is connected to an upstream-side end portion of the duct 1.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An air intake device for an internal combustion engine, comprising:

a duct having therein a first air flow passage configured to conduct air into a combustion chamber of the internal combustion engine;

a housing arranged to surround a periphery of the duct and having therein a second air flow passage that allows the first air flow passage to communicate with an intake port of the internal combustion engine;

a rotary shaft rotatably supported by the housing; and a rectangular U-shaped rotary valve configured to reciprocate around the shaft in a rotational direction, the rotary valve having a valve plate, wherein an opening is defined between a downstream end of the duct and the valve plate and configured to generate a localized flow in the intake port of the internal combustion engine when the rotary valve is in a fully-closed state, the valve plate is configured to reciprocate around the shaft in the rotational direction so as to move outside the duct and along the downstream end of the duct, so that opening areas of the first and second air flow passages are changed, the valve plate has a circular curved surface portion having a radius of curvature centered on the shaft, the housing has a pair of opposed walls arranged at a downstream side of a moving path of the rotary valve in an air flow direction, the opposed walls are opposed to each other with the second air flow passage interposed between the opposed walls, and each of the opposed walls has a circular opposed surface that is opposed to the curved surface portion.

2. The air intake device according to claim 1, wherein the opening is formed so as to open at one side in a height direction or a width direction of the first air flow passage.

3. The air intake device according to claim 1, wherein the housing has a flow-passage wall surface, so that a flow passage is formed between the downstream end of the duct and the flow-passage wall surface.

4. The air intake device according to claim 1, wherein the housing has a protrusion that protrudes toward an upstream side of the second air flow passage in the air flow direction so as to contact the downstream end of the duct near the opening.

5. The air intake device according to claim 4, wherein the housing has a recess, which is dented toward the intake port side of the internal combustion engine, outside the protrusion.

6. The air intake device according to claim 1, wherein a flow passage formed between the housing and the downstream end of the duct near the opening has a maze structure having a flexed shape or a groove shape.

7. The air intake device according to claim 1, wherein a flow passage formed between the housing and the curved surface portion has a maze structure having a flexed shape or a groove shape.

8. The air intake device according to claim 1, wherein the curved surface portion has an inner surface and an outer surface in a curvature direction of the curved surface portion, when the rotary valve is in the fully-closed state, the inner surface of the curved surface portion is opposed to the duct with a first clearance interposed between the duct and the inner surface, and when the rotary valve is in the fully-closed state, the outer surface of the curved surface portion is opposed to the pair of opposed walls with a second clearance interposed between the pair of opposed walls and the outer surface.

9. The air intake device according to claim 8, wherein the rotary valve has a pair of connecting portions that is connected to the shaft, and a pair of side plates that extends outward in a radial direction of the shaft from the connecting portions, and the side plates cover lateral openings of the first clearance when the rotary valve is in the fully-closed state.

10. The air intake device according to claim 9, wherein each of the side plates is opposed to an outer surface of the duct with a third clearance interposed between each of the side plates and the outer surface of the duct.

11. The air intake device according to claim 2, wherein the housing has a flow-passage wall surface, so that a flow passage is formed between the downstream end of the duct and the flow-passage wall surface.

12. The air intake device according to claim 2, wherein the housing has a protrusion that protrudes toward an upstream side of the second air flow passage in the air flow direction so as to contact the downstream end of the duct near the opening.

13. The air intake device according to claim 12, wherein the housing has a recess, which is dented toward the intake port side of the internal combustion engine, outside the protrusion.

14. The air intake device according to claim 2, wherein a flow passage formed between the housing and the downstream end of the duct near the opening has a maze structure having a flexed shape or a groove shape.

15. The air intake device according to claim 2, wherein a flow passage formed between the housing and the curved surface portion has a maze structure having a flexed shape or a groove shape.

16. The air intake device according to claim 2, wherein the curved surface portion has an inner surface and an outer surface in a curvature direction of the curved surface portion, when the rotary valve is in the fully-closed state, the inner surface of the curved surface portion is opposed to the duct with a first clearance interposed between the duct and the inner surface, and when the rotary valve is in the fully-closed state, the outer surface of the curved surface portion is opposed to the pair of opposed walls with a second clearance interposed between the pair of opposed walls and the outer surface.

17. The air intake device according to claim 16, wherein the rotary valve has a pair of connecting portions that is connected to the shaft, and a pair of side plates that extends outward in a radial direction of the shaft from the connecting portions, and the side plates cover lateral openings of the first clearance when the rotary valve is in the fully-closed state.

18. The air intake device according to claim 17, wherein each of the side plates is opposed to an outer surface of the duct with a third clearance interposed between each of the side plates and the outer surface of the duct.

* * * * *